United States Patent
Ozawa

(10) Patent No.: US 9,036,081 B2
(45) Date of Patent: May 19, 2015

(54) VIDEO SIGNAL TRANSMISSION DEVICE, VIDEO SIGNAL RECEPTION DEVICE, AND VIDEO SIGNAL TRANSMISSION SYSTEM

(71) Applicant: THINE ELECTRONICS, INC., Chuo-ku, Tokyo (JP)

(72) Inventor: Seiichi Ozawa, Wako (JP)

(73) Assignee: THINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 14/294,306

(22) Filed: Jun. 3, 2014

(65) Prior Publication Data

US 2014/0285715 A1  Sep. 25, 2014

Related U.S. Application Data

(62) Division of application No. 12/599,768, filed as application No. PCT/JP2008/069859 on Oct. 31, 2008, now Pat. No. 8,780,932.

(30) Foreign Application Priority Data

Nov. 30, 2007  (JP) .................................. 2007-311150

(51) Int. Cl.
*H04N 7/01* (2006.01)
*H04N 7/06* (2006.01)
(Continued)

(52) U.S. Cl.
CPC ............... *H04N 7/06* (2013.01); *H04N 5/0675* (2013.01); *G06F 3/14* (2013.01); *G09G 5/006* (2013.01); *H04N 5/765* (2013.01); *H04N 21/43632* (2013.01)

(58) Field of Classification Search
None
See application file for complete search history.

(56) References Cited

U.S. PATENT DOCUMENTS 6,356,212 B1 * 3/2002 Lyons et al. ..................... 341/60
7,088,398 B1 * 8/2006 Wolf et al. ................. 348/423.1
(Continued)

FOREIGN PATENT DOCUMENTS

EP  0788048 A1  1/1997
EP  0788048 A1  8/1997
(Continued)

OTHER PUBLICATIONS

English Translation of an International Preliminary Report on Patentability issued on Aug. 19, 2010 in application No. PCT/JP2008/069859.
(Continued)

*Primary Examiner* — Kibrom T Hailu
(74) *Attorney, Agent, or Firm* — Sughrue Mion, PLLC

(57) ABSTRACT

A video transmission device 10 has: a packer 11 which receives a video signal, a sync signal, and a data-enable signal, and generates a plurality of packet signals by packetizing the video signal and the sync signal based on the data-enable signal and according to the number of bytes of a packet corresponding to the number of gradation bits of the video signal; an encode unit 15 which generates a plurality of encoded packet signals by encoding the plurality of packet signals; and a serializer 14 which generates a serial packet signal by parallel-serial converting the plurality of encoded packet signals. The packer 11 generates a control signal including a pulse with a pulse width corresponding to the number of bytes of the packet, and the encode unit 15 subjects a portion of the packet signals corresponding to the pulse in the control signal from the packer, to an encode process which is different from a process for the other portion.

5 Claims, 11 Drawing Sheets

(51) Int. Cl.
*H04N 5/067* (2006.01)
*G06F 3/14* (2006.01)
*G09G 5/00* (2006.01)
*H04N 5/765* (2006.01)
*H04N 21/4363* (2011.01)

(56) References Cited

U.S. PATENT DOCUMENTS

| | | | |
|---|---|---|---|
| 7,257,163 B2 * | 8/2007 | Hwang et al. | 375/242 |
| 2007/0011552 A1 * | 1/2007 | Altmann | 714/746 |
| 2007/0257923 A1 | 11/2007 | Whitby-Strevens | |
| 2008/0273602 A1 * | 11/2008 | Glen | 375/257 |

FOREIGN PATENT DOCUMENTS

| | | | |
|---|---|---|---|
| EP | 1473695 | A2 | 3/2004 |
| EP | 1736867 | A2 | 6/2006 |
| EP | 1736867 | A2 | 12/2006 |
| JP | 2005-142872 | A | 6/2005 |
| KR | 100260816 | B1 | 7/2000 |
| WO | 2007/132877 | A1 | 5/2007 |
| WO | 2007/125754 | A1 | 11/2007 |

OTHER PUBLICATIONS

"V-by-One HS Standard: Version 1.0" May 26, 2008, pp. 1-41, Thine Electronics, Inc.

Kumar, Sanjiv, "SuperSpeed USB 3.0 Specification Revolutionizes an Estalished Standard", Nov. 2008, pp. 1-6, USB 3.0 Promoter Group 2007-2008.

Hitachi, Ltd. et al, "High Definition Multimedia Interface: Specification Version 1.3a" Nov. 10, 2006, pp. 8-9 54-97 140-144, HDMI Licensing, LLC.

Office Action issued by the Korean Patent Office in Korean Application No. 10-2009-7013075 dated Nov. 29, 2013.

English Translation of an International Preliminary Report on Ptaentability issued on Aug. 19, 2010 in application No. PCT/JP2008/069859.

* cited by examiner

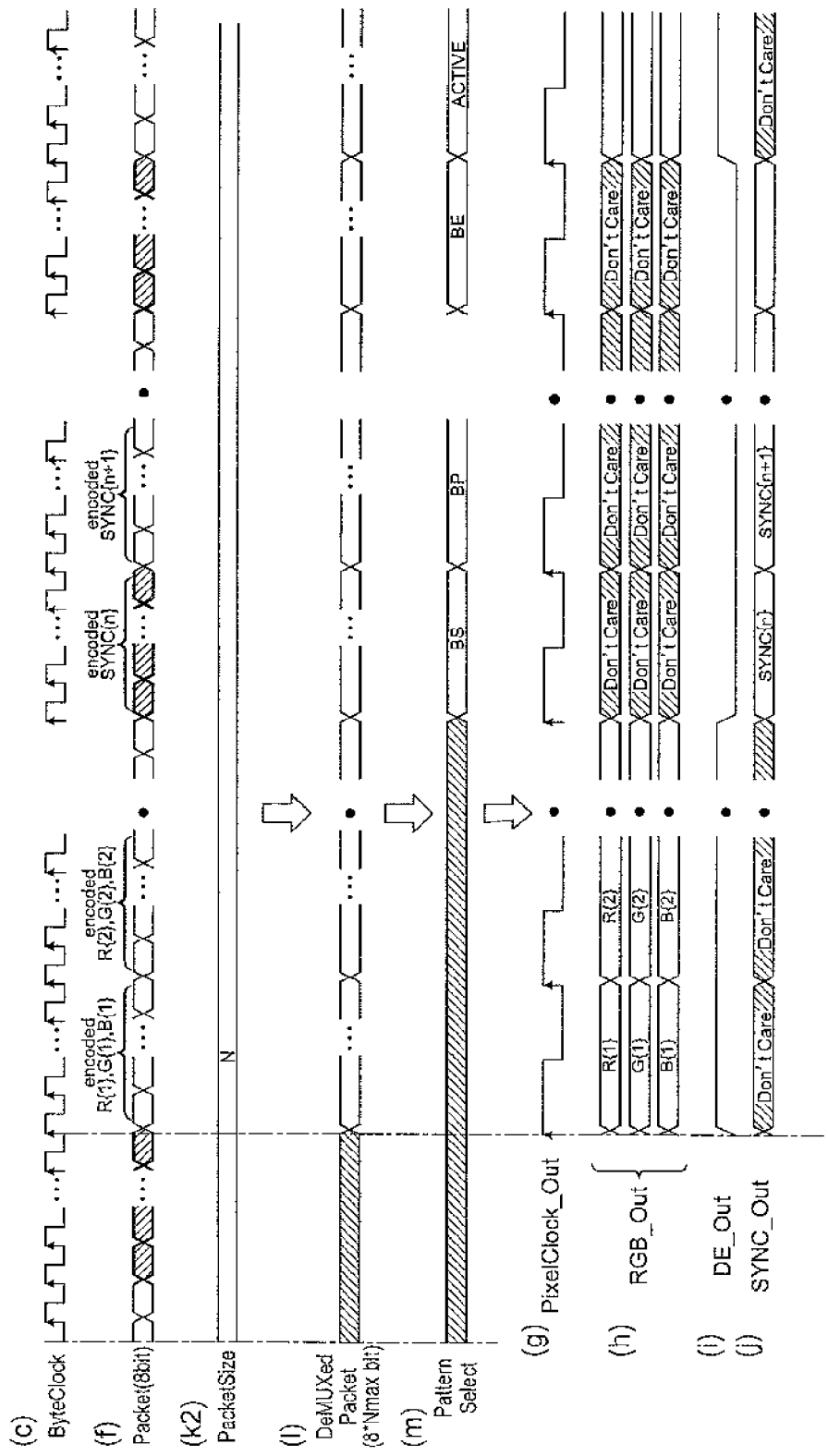

VIDEO SIGNAL TRANSMISSION DEVICE, VIDEO SIGNAL RECEPTION DEVICE, AND VIDEO SIGNAL TRANSMISSION SYSTEM

CROSS REFERENCE TO RELATED APPLICATIONS

This application is a divisional of U.S. patent application Ser. No. 12/599,768, filed Nov. 11, 2009, which is a National Stage of International Application No. PCT/JP2008/069859, filed on Oct. 31, 2008, which claims priority from Japanese Patent Application No. 2007-311150, filed on Nov. 30, 2007, the contents of all of which are incorporated herein by reference in their entirety.

TECHNICAL FIELD

The present invention relates to a video signal transmission device, a video signal reception device, and a video signal transmission system using the video signal transmission device and the video signal reception device.

BACKGROUND ART

A video signal transmission system that transmits video signals to an LCD (Liquid Crystal Display) or a PDP (Plasma Display Panel) is known. In this type of video signal transmission system, a plurality of signals, such as a video signal for each of RGB, data-enable signal and sync signal, are transmitted between the video signal transmission device and video signal reception device.

Conventionally, a signal line is generally used for each signal between the video signal transmission device and video signal reception device. With this method, however, the number of physical signal lines increases. To solve this problem, Patent Document 1 proposes a configuration to decrease the number of signal lines by multiplexing a plurality of data and clocks.

Patent Document 1: Japanese Patent Application Laid-Open No. 2005-142872

DISCLOSURE OF THE INVENTION

Problem to be Solved by the Invention

A video signal and a sync signal may be packetized in the video signal transmission system. Also in the video signal transmission system, the number of bytes of a packet for each pixel may differ depending on the number of gradation bits of the video signal. However, the video signal transmission system according to Patent Document 1 cannot support a change in the number of bytes of a packet for each pixel of a video signal, that is, a change in the number of gradation bits of a video signal.

With the foregoing in view, it is an object of the present invention to provide a video signal transmission device, a video signal reception device and a video signal transmission system, that can decrease the number of signal lines and can support the change in the number of grayscale bits of the video signal.

Means for Solving the Problem

A video signal transmission device of the present invention has (a) a packer which receives a video signal, a sync signal and a data-enable signal, and generates a plurality of packet signals by packetizing the video signal and the sync signal based on the data-enable signal and according to the number of bytes of a packet corresponding to the number of gradation bits of the video signal, (b) an encode unit which generates a plurality of encoded packet signals by encoding the plurality of packet signals from the packer, and (c) a serializer which generates a serial packet signal by parallel-serial converting the plurality of encoded packet signals from the encode unit, (d) the packer generating a control signal including a pulse with a pulse width corresponding to the number of bytes of the packet, and (e) the encode unit subjects a portion of the packet signals corresponding to a period where the pulse exists in the control signal from the packer, to an encode process which is different from a process for the other portion.

According to this video signal transmission device, a portion of packet signals corresponding to a period where a pulse exists in the control signal from the packer is subjected to an encode process which is different from a process for the other portion by the encode unit, so a video signal reception device which receives a signal from this transmission device can regenerate the control signal when the received signal is decoded. Since this control signal includes a pulse and the pulse width of this pulse corresponds to the number of bytes of the packet, the counterpart video signal reception device can determine the number of bytes of a packet by a pulse width of the pulse in the regenerated control signal, that is, the number of gradation bits of the video signal. As a result, the counterpart video signal reception device can appropriately regenerate the video signal, even if the number of gradation bits of the video signal changes, and the number of bytes of a packet for each pixel of the video signal changes in the video signal transmission device.

Also according to the video signal transmission device, the transmission signal is parallel-serial converted by the serializer, so the number of signal lines can be decreased.

The encode unit has (a) a scrambler which generates a plurality of scramble packet signals by scrambling the plurality of packet signals from the packer, (b) and an encoder which generates the plurality of encoded packet signals by encoding the plurality of scrambled packet signals from the scrambler, (c) the scrambler does not scramble a portion of the packet signals corresponding to the period where the pulse of the control signal exists, and (d) the encoder subjects a portion of the scrambled packet signals corresponding to the period where the pulse of the control signal exists, to an encode process which is different from a process for the other portion.

A signal may be scrambled in the video signal transmission device. According to the present video signal transmission device, the scrambler does not scramble a portion of packet signals corresponding to the period where the pulse of the control signal exists, therefore the counterpart video signal reception device which receives the signal from the video signal transmission device can appropriately regenerate the control signal, and can appropriately determine the number of bytes of the packet, that is, the number of gradation bits of the video signal, from the regenerated control signal.

A video signal reception device of the present invention is a video signal reception device which receives the above mentioned serial packet signal, having (a) a deserializer which regenerates a plurality of encoded packet signals by serial-parallel converting the serial packet signal, (b) a decode unit which regenerates a plurality of packet signals by decoding the plurality of encoded packet signals from the deserializer, and (c) an unpacker which regenerates a video signal, a sync signal and a data-enable signal by unpacketizing the plurality of packet signals from the decode unit, where (d) the decode unit regenerating a control signal including a pulse with a pulse width corresponding to a period of a portion of the plurality of encoded packet signals, which is a portion on which an encode process that is different from a process for the other portion has been performed, and (e) the unpacker determining the number of bytes of a packet based on the pulse width of the pulse in the control signal from the decode unit and unpacketizes the plurality of packet signals according to the number of bytes of the packet.

According to this video signal reception device, a decode unit regenerates a control signal including a pulse with a pulse width corresponding to a period of a portion of a plurality of encoded packet signals on which an encode process that is different from the process for the other portion has been performed. As mentioned above, the pulse width of the pulse in this control signal corresponds to the number of bytes of the packet, so the unpacker can determine the number of bytes of a packet, that is, the number of gradation bits of the video signal, by the pulse width of the pulse in the control signal, and the plurality of packet signals are unpacketized according to the number of bytes of this packet. As a result, the video signal reception device can appropriately regenerate the video signal, even if the number of gradation bits of the video signal changes, and the number of bytes of a packet for each pixel of the video signals is different in the video signal transmission device.

Also according to the video signal reception device, the receive signal is serial-parallel converted by the deserializer, so the number of signal lines can be decreased.

Another video signal reception device of the present invention is a video signal reception device which receives the above mentioned serial packet signal, having (a) a deserializer which regenerates a plurality of encoded packet signals by serial-parallel converting the serial packet signal, (b) a decode unit which regenerates a plurality of packet signals by decoding the plurality of encoded packet signals from the deserializer, and (c) an unpacker which regenerates a video signal, a sync signal and a data-enable signal by unpacketizing the plurality of packet signals from the decode unit, where (d) the a packer receives a set value of the number of bytes of a packet corresponding to the number of gradation bits of the video signal and unpacketizes the plurality of packet signals according to the set value of the number of bytes of the packet.

According to this video signal reception device, the unpacker unpacketizes a plurality of packet signals according to the set value of the number of bytes of the packet corresponding to the number of gradation bits of the video signal. Therefore the video signal reception device can appropriately regenerate the video signal by changing the set value of the number of bytes of the packet, even if the number of gradation bits of the video signal changes, and the number of bytes of a packet for each pixel of the video signal changes in the video signal reception device.

Also according to the video signal reception device, the receive signal is serial-parallel converted by the deserializer, so the number of signal lines can be decreased.

The decode unit has (a) a decoder which regenerates a plurality of scrambled packet signals by decoding the plurality of encoded packet signals from the deserializer, and (b) a descrambler which regenerates the plurality of packet signals by descrambling the plurality of scrambled packet signals from the decoder, (c) the decoder regenerates the control signal including a pulse with a pulse width corresponding to a period of a portion of the plurality of encoded packet signals on which an encode process that is different from a process for the other portion has been performed, and (d) the descrambler does not descramble a portion of the packet signals corresponding to a period where the pulse of the control signal exists.

According to this video signal reception device, the descrambler does not scramble a portion of packet signals corresponding to the period where the pulse of the control signal exists, so the number of bytes of a packet, that is, the number of gradation bits of the video signal can be appropriately determined by the control signal.

The video signal transmission system of the present invention has the above mentioned video signal transmission device and the above mentioned video signal reception device.

According to this video signal transmission system, even if the number of gradation bits of the video signal changes, the video signal transmission device can make the number of bytes of a packet different for each pixel for the video signal, and the video signal reception device can determine the number of bytes of a packet for each pixel of the video signal and appropriately regenerate the video signal, therefore the video signal can be appropriately transmitted and received.

Also according to the video signal transmission system, the transmission signal is parallel-serial converted by the serializer in the video signal transmission device, and the receive signal is serial-parallel converted by the deserializer in the video signal reception device, so the number of signal lines can be decreased.

Also according to this video signal transmission system, the control signal can be appropriately regenerated even if the signal is scrambled, and the number of bytes of the packet, that is, the number of gradation bits of the video signal, can be appropriately determined by the regenerated control signal.

Effect of the Invention

According to the present invention, a video signal transmission device, video signal reception device and video signal transmission system, which require less signal lines and can support changes of the number of gradation bits of the video signals, can be provided.

BRIEF DESCRIPTION OF THE DRAWINGS

FIG. 11 is a timing chart depicting a signal of each unit in the unpacker shown in FIG. 10.

Figure 1:
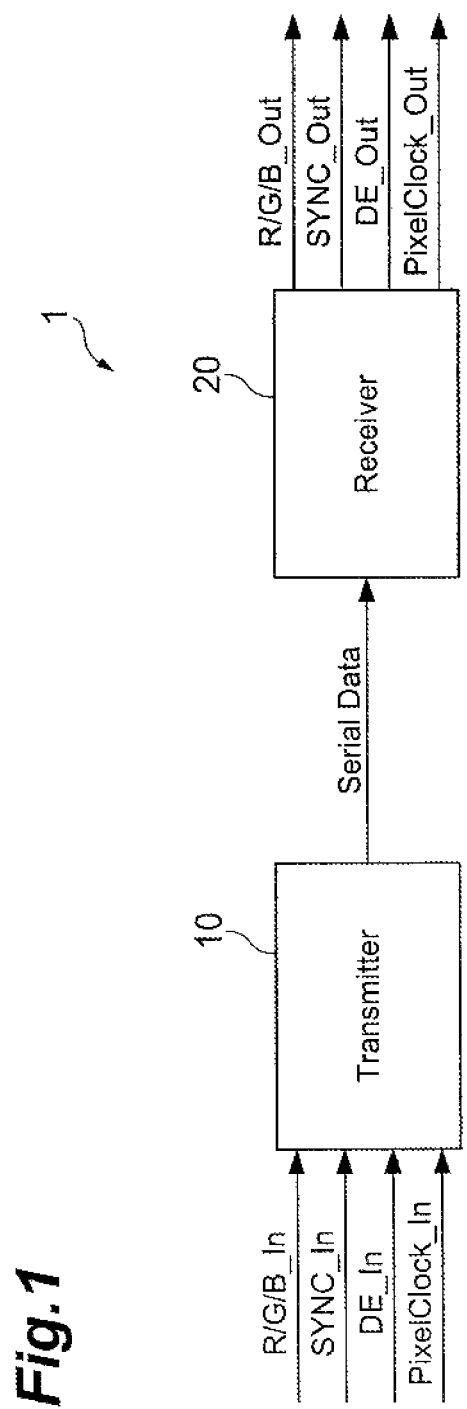
FIG. 1 is a circuit block diagram depicting a configuration of a video signal transmission system according to an embodiment of the present invention.

EXPLANATION OF REFERENCE NUMERALS 1 video signal transmission system
10 video signal transmission device
11 packer
12 scrambler
13 encoder
14 serializer
15 encode unit
20 video signal reception device
21 deserializer
22 decoder
23 descrambler
24, 24A unpacker
25 decode unit
31, 32, 35, 36 FF
33 pattern selector
34, 41 selector
37 to 40 encoder
42 MUX
51 packet size detector
52 DEMUX
53 pattern decoder
54 pixel decoder
55 sync decoder Best Mode for Carrying Out the Invention The preferred embodiments of the present invention will now be described in detail with reference to the drawings. In each drawing, an identical or similar portion is denoted with an identical reference symbol.

FIG. 1 is a circuit block diagram depicting a configuration of a video signal transmission system according to an embodiment of the present invention. The video signal transmission system 1 shown in FIG. 1 has a video signal transmission device (Transmitter) 10 and a video signal reception device (Receiver) 20.

The video signal transmission device 10 receives a video signal (R/G/B_In) for each RGB, sync signal (SYNC_In), data-enable signal (DE_In) and pixel clock (Pixcel Clock_In), packetizes them, then sends a parallel-serial converted serial packet signal (Serial Data). Details on the video signal transmission device 10 will be described later.

The video signal reception device 20 receives the serial packet signal from the video signal transmission device 10, serial-parallel converts it, then unpacketizes it to regenerate a video signal (R/G/B_Out) for each RGB, sync signal (SYNC_Out), data-enable signal (DE_Out) and pixel clock (Pixcel Clock_Out). Details on the video signal reception unit 20 will be described later.

Figure 2:
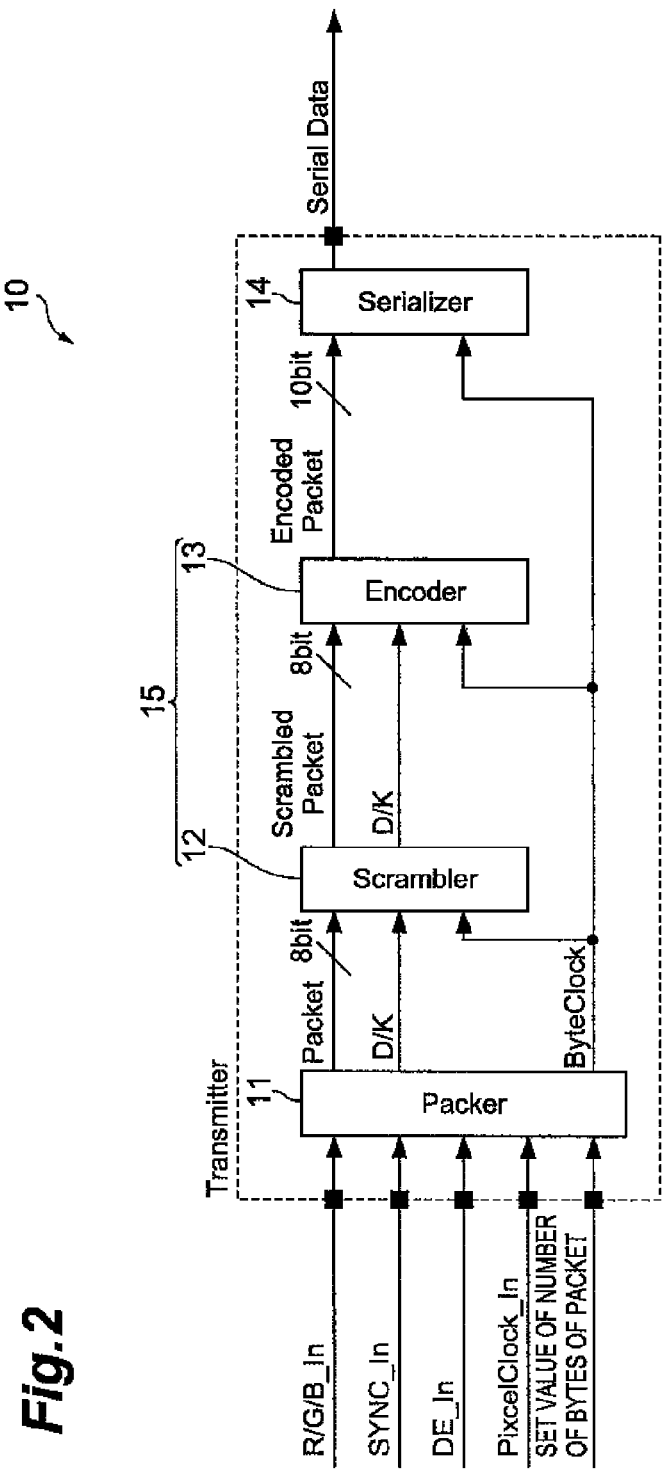
FIG. 2 is a circuit block diagram depicting a configuration of a video signal transmission device according to an embodiment of the present invention.
Figure 3:
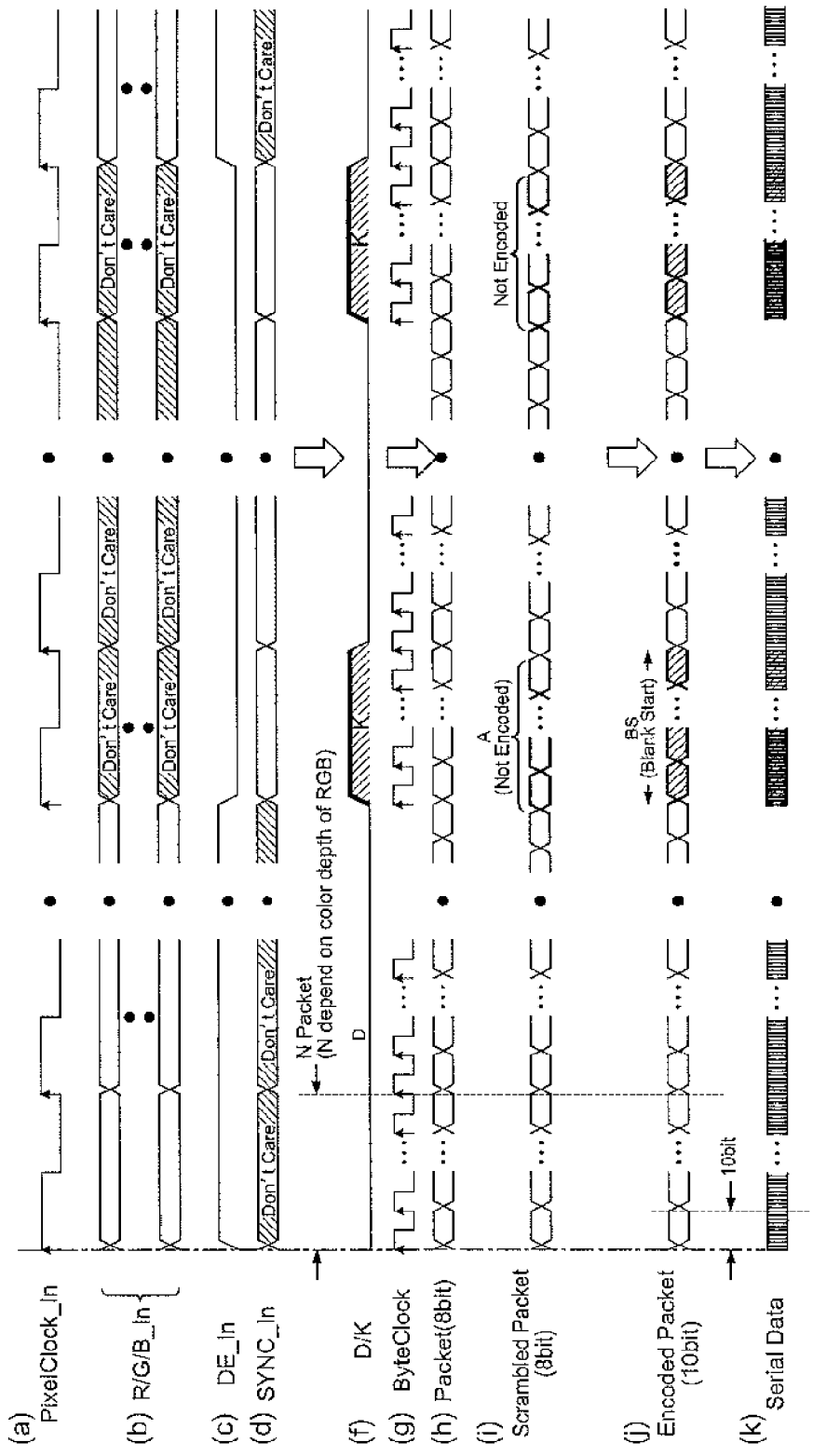
FIG. 3 is a timing chart depicting a signal of each unit in the video signal transmission device shown in FIG. 2.

Now the video signal transmission device 10 will be described in detail. FIG. 2 is a circuit block diagram depicting a configuration of the video signal transmission device according to an embodiment of the present invention, and FIG. 3 is a timing chart depicting a signal of each unit of the video signal transmission device shown in FIG. 2. The video signal transmission device 10 shown in FIG. 2 has a packer 11, scrambler 12, encoder 13 and serializer 14. The scrambler 12 and encoder 13 constitute an encode unit 15.

The packer 11 receives the set values of the video signal (R/G/B_In) for each RGB, sync signal (SYNC_In), data-enable signal (DE_In), pixel clock (Pixcel Clock_In) and the number of bytes of packet N (FIG. 3(a) to (d)). Here the set value of the number of bytes of packet N is a value that is predetermined in association with the number of gradation bits of the video signal.

The packet 11 generates a control signal (D/K) based on the data-enable signal (FIG. 3(f)), and also generates a byte clock (Byte Clock), which is a pixel clock multiplied by N according to the set value of the number of bytes N of a packet (FIG. 3(g)). The control signal here is a signal including a pulse K with a pulse width corresponding to the number of bytes N of a packet, and will be described in detail later.

The packer 11 packetizes the video signal and sync signal based on the byte clock, and generates an 8-bit (that is 8 parallel) packet signal(s) (Packet) (FIG. 3(h)). As mentioned above, the byte clock is a pixel clock multiplied by N, and this value N is the number of bytes of a packet, therefore the packer 11 packetizes a video signal and sync signal with the number of bytes N of a packet corresponding to the number of gradation bits of the video signal. The packer 11 will be described in detail later. The packer 11 outputs this 8-bit packet signal, control signal and byte clock to the scrambler 12.

The scrambler 12 has a random number generator, and scramblers the 8-bit packet signal based on the byte clock, using a random number from the random number generator, so as to generate an 8-bit scrambled packet signal (Scrambled Packet) (FIG. 3(i)). In this case, the scrambler 12 does not scramble a portion A of the packet signals corresponding to the period where the pulse K of the control signal exists. The scrambler 12 outputs the 8-bit scrambled packet signal and control signal to the encoder 13.

The encoder 13 encodes the scrambled packet signal based on the byte clock, so as to generate an encoded packet signal (Encoded Packet) (FIG. 3(j)). At this time, the encoder 13 encodes the portion of the scrambled packet signals corresponding to a period where the pulse D of the control signal exists, according to a mapping of D, and encodes a portion A of the scrambled packet signals corresponding to the period where the pulse K of the control signal exists according to a mapping of K, which is different from the mapping of D. The encoder 13 is an 8b10b encoder, for example, and generates 10-bit encoded packet signals from an 8-bit scrambled packet signal. The encoder 13 outputs these encoded packet signals to the serializer 14.

The serializer 14 generates a clock, that is, a byte clock multiplied by 10. Based on this clock, the serializer 14 parallel-serial converts a 10-bit encoded packet signal so as to generate a 1-bit serial packet signal (Serial Data) (FIG. 3(k)).

Figure 4:
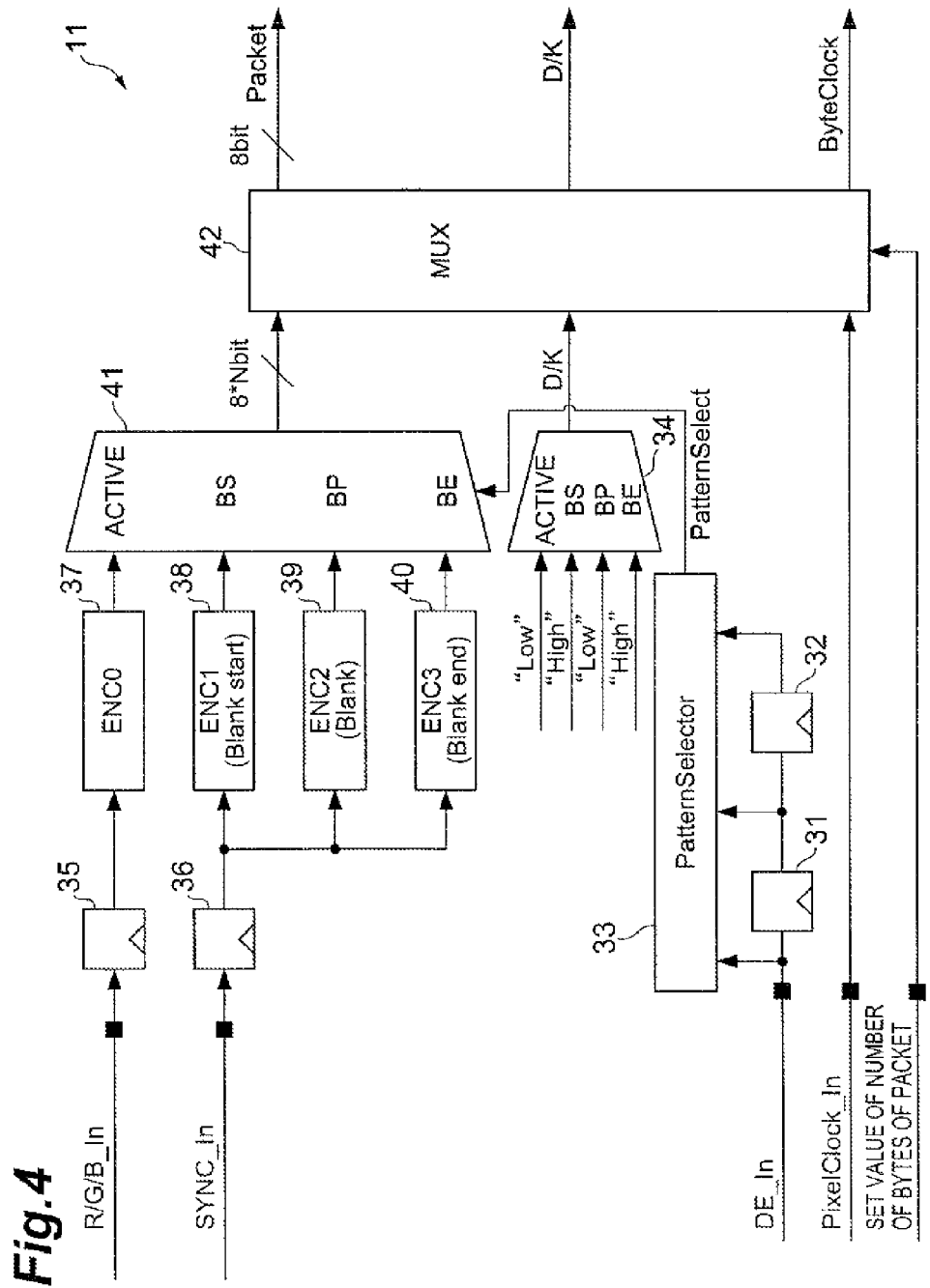
FIG. 4 is a circuit block diagram depicting a configuration of a packer according to an embodiment of the present invention.
Figure 5:
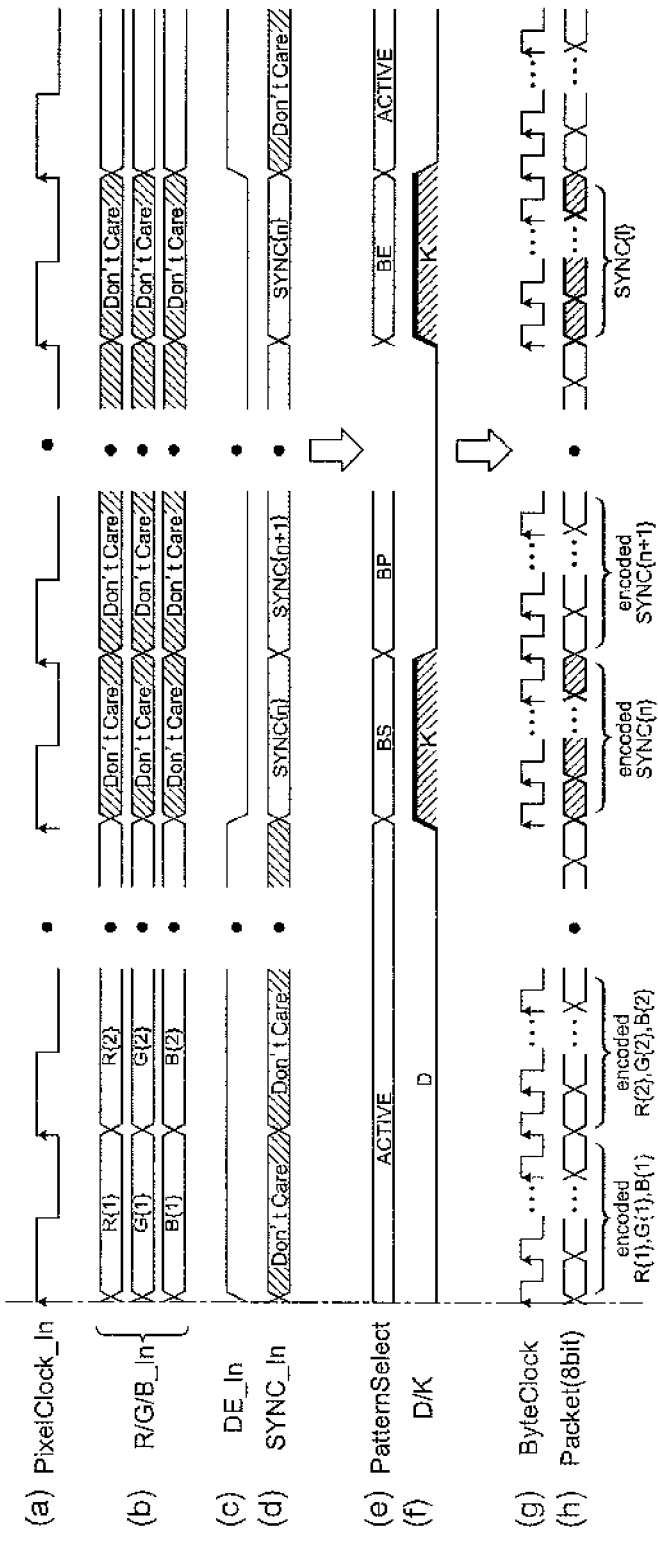
FIG. 5 is a timing chart depicting a signal of each unit in the packer shown in FIG. 4.

Now the packer 11 will be described in detail. FIG. 4 is a circuit block diagram depicting a configuration of the packer according to an embodiment of the present invention, and FIG. 5 is a timing chart depicting a signal of each unit of the packer shown in FIG. 4. The packer 11 shown in FIG. 4 has FFs (Flip-Flop) 31, 32, a pattern selector (Pattern Selector) 33, a selector 34, FFs 35, 36, encoders (ENC0 to ENC3) 37, 38, 39, 40, a selector 41 and MUX (Multiplexer) 42.

The FFs 31 and 32 are connected in series, and delays signals to be input respectively. FF 31 receives a data-enable signal (DE_In), delays it by 1 cycle of the pixel clock, for example, and outputs it to FF 32. In the same way, the FF 32 delays the output signal from the FF 31 by 1 cycle of the pixel clock, for example. The data-enable signals which are delays by 1 cycle and 2 cycles of the pixel clock respectively by FFs 31 and 32, and the original data-enable signal, are input to the pattern selector 33.

The pattern selector 33 detects a rise transition timing and fall transition timing of the data-enable signal using the data-enable signal, the data-enable signal delayed by 1 cycle of the pixel clock, and the data enable clock delayed by 2 cycles of the pixel clock, so as to generate a pattern select signal (Pattern Select) (FIG. 5(e)).

For example, the pattern selector 33 detects the rise transition timing and the fall transition of the data-enable signal, generates a pattern select signal which indicates "active" from this rise transition timing to the fall transition timing, and generates a pattern select signal which indicates "blank" from the fall transition timing to the rise transition timing. In concrete terms, the pattern selector 33 generates a pattern select signal which indicates a blank start (BS) for one pixel from the fall transition timing, indicates a blank end (BE) for one pixel before the rise transition timing, and indicates a blank (BP) between the blank start and blank end. The pattern selector 33 supplies this pattern select signal to the selectors 34 and 41.

The selector 34 receives two D signals (e.g. LOW level signals) and two K signals (e.g. HIGH level signals). The selector 34 generates a control signal (D/K) based on the pattern select signal (FIG. 5(f)). For example, the selector 34 selects the D signal while the pattern select signal indicates active or blank (BP), and selects the K signal while the pattern select signal indicates the blank start (BS) or blank end (BE). In this case, one pixel of the pixel clock corresponds to the number of bytes of a packet N, that is, the number of gradation bits of the video signal, so the selector 34 generates a control signal which includes the pulse D and pulse K. The selector 34 outputs this control signal to the MUX 42.

The FFs 35 and 36, on the other hand, match the timing of the video signal (R/G/B_In) and the sync signal (SYNC_In) based on the pixel clock, for example, and outputs them to the encoders 37 to 40.

The encoder 37 encodes the video signal, of which timing is matched by FF 35, and outputs it to the selector 41. In the same way, the encoders 38 to 40 encode the sync signal, of which timing is matched by FF 36, and outputs it to the selector 41 respectively.

The selector 41 generates an 8×N-bit combined signal by combining the output signals of the encoders 37 to 40, based on the pattern select signal. For example, the selector 41 selects and outputs the video signal encoded by the encoder 37, while the pattern select signal indicates active, and selects and outputs the sync signal (Blank Start) encoded by the encoder 38 while [the pattern select signal] indicates blank start. The selector 41 also selects and outputs the sync signal (Blank) encoded by the encoder 39 while the pattern select signal indicates blank, and selects and outputs the sync signal (Blank End) encoded by the encoder 40 while [the pattern select signal] indicates blank end. The selector 41 outputs 8×N-bit combined signal generated in this way to the MUX 42.

In the MUX 42, the pixel clock is input, and a set value of the number of bytes of packet N is also input in advance. According to this set value, the MUX 42 generates a byte clock, which is a pixel clock signal multiplied by N (FIG. 5(g)). The MUX 42 multiplies the signal from the selector 41 by N using this byte clock, so as to generate an 8 byte packet signal (FIG. 5(h)). The MUX 42 also outputs the control signal and the byte clock from the selector 34.

In this way, according to the video signal transmission device 10 of the present embodiment, the encode unit 15 (encoder 13 in the present embodiment) subjects a portion of packet signals (scrambled packet signals after scramble processing in the present embodiment) corresponding to a period where the pulse exists in the control signal from the packer 11, to an encode process which is different from a process for the other portion, so the counterpart video signal reception device 20 can regenerate the control signal during decoding. This control signal includes a pulse, and the pulse width of this pulse corresponds to the number of bytes of the packet, so the counterpart video signal reception device 20 can determine the number of bytes of a packet, that is, the number of gradation bits of the video signal, by the pulse width of the pulse in the regenerated control signal. As a result, the counterpart video signal reception device 20 can appropriately regenerate the video signal, even if the number of gradation bits of the video signal changes, and the number of bytes of a packet changes in the video signal transmission device 10.

In particular, an increase in the number of gradation bits of a video signal is expected in the future, but according to this video signal transmission device 10, the increase in the number of gradation bits of a video signal can be supported.

Also according to the video signal transmission device 10, the transmission signal is parallel-serial converted by the serializer 14, so the number of signal lines can be decreased.

Furthermore, according to the video signal transmission device 10, even if the signal is scrambled, the scrambler 12 does not scramble a portion of packet signals corresponding to the period where the pulse of the control signal exists, therefore the video signal reception device 20, which is a counterpart of the video signal transmission device 10 and receives the signal from this transmission device, can appropriately regenerate the control signal, and can appropriately determine the number of bytes of the packets, that is, the number of gradation bits of the video signal, based on the regenerated control signal.

Figure 6:
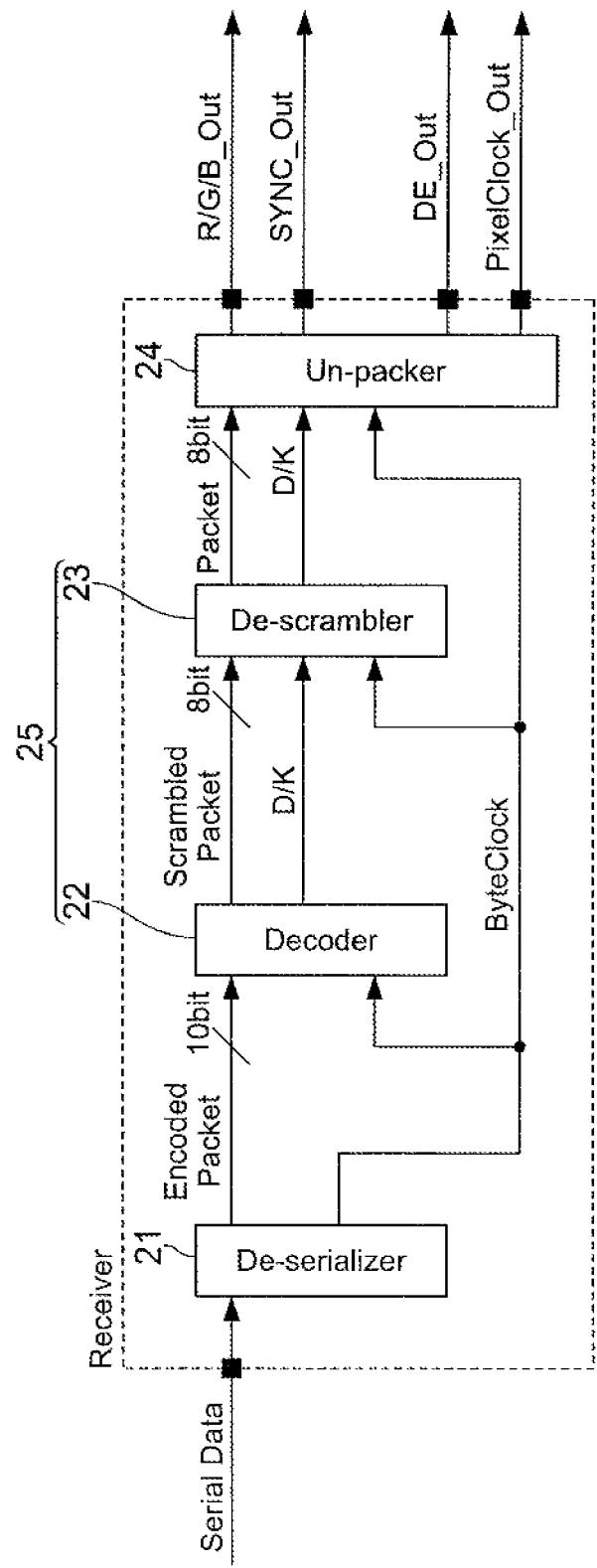
FIG. 6 is a circuit block diagram depicting a configuration of a video signal reception device according to an embodiment of the present invention.
Figure 7:
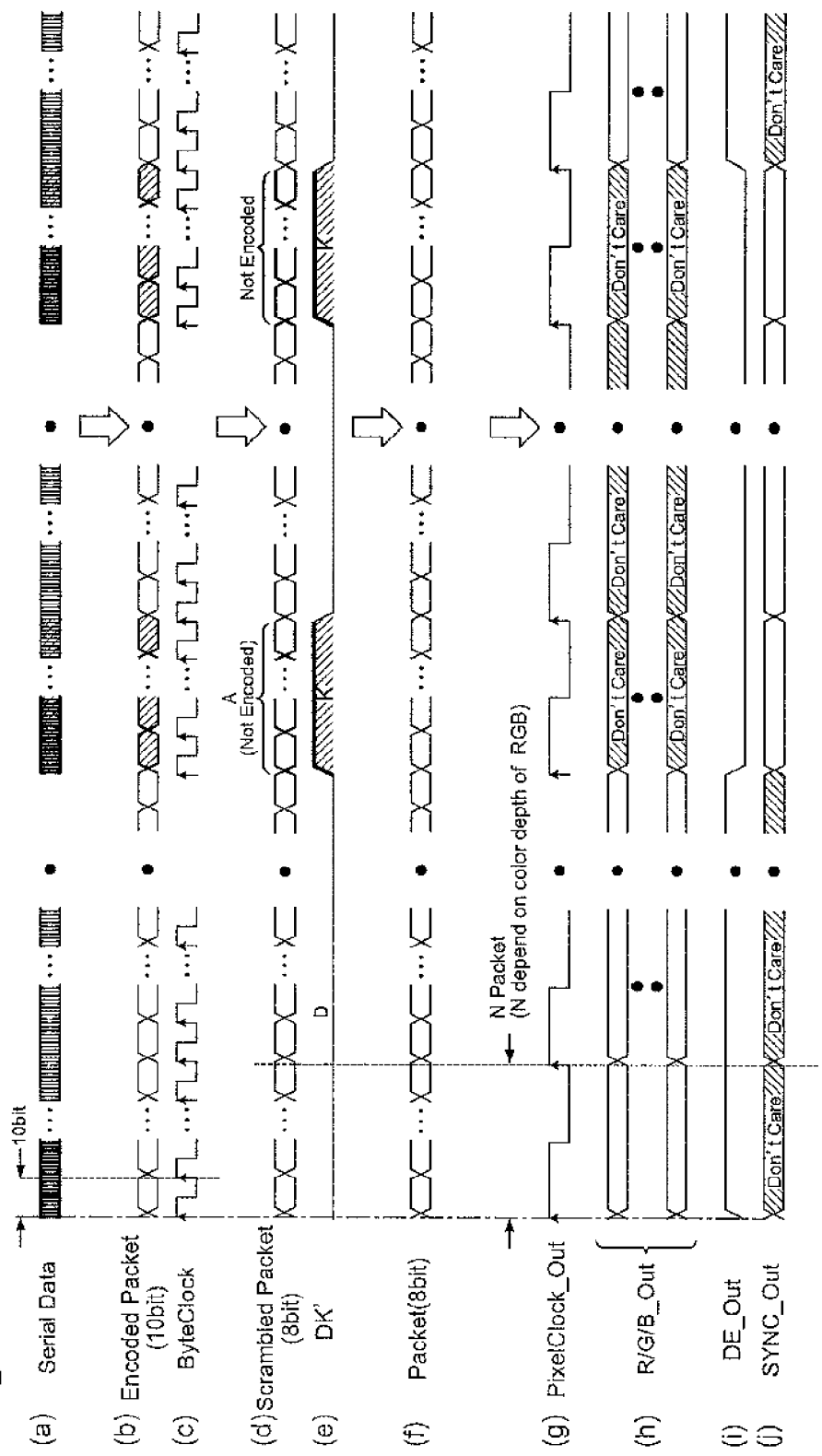
FIG. 7 is a timing chart depicting a signal of each unit in the video signal reception device shown in FIG. 6.

Now the video signal reception device 20 will be described in detail. FIG. 6 is a circuit block diagram depicting the video signal reception device according to an embodiment of the present invention, and FIG. 7 is a timing chart depicting a signal of each unit of the video signal reception device shown in FIG. 6. The video signal reception device 20 shown in FIG. 6 has a deserializer 21, decoder 22, descrambler 23 and unpacker 24. The decoder 22 and descrambler 23 constitute a decode unit 25.

The deserializer 21 receives a serial packet signal (Serial Data) from the video signal transmission device 10 (FIG. 7(a)). The deserializer 21 has CDR (Clock Data Recovery), for example, and regenerates a clock, that is a byte clock multiplied by 10, from the serial packet signal. Based on this clock, the deserializer 21 serial-parallel converts the 1-bit serial packet signal, and regenerates the 10-bit encoded packet signal (Encoded Packet) (FIG. 7(b)). The deserializer 21 outputs the encoded packet signal to the decoder 22. The deserializer 21 regenerates a byte clock, that is this clock divided by 10 (FIG. 7(c)).

The decoder 22 decodes the encoded packet signal based on the byte clock, so as to regenerate the scrambled packet signal (Scrambled Packet) (FIG. 7(d)). If the encoded packet signal corresponds to the mapping of D at this time, the decoder 22 performs the decoding based on the mapping of D, and if it corresponds to the mapping of K, the decoder 22 performs decoding based on the mapping of K. The decoder 22 is a 10b8b decoder, for example, and generates an 8-bit scrambled packet signal from a 10-bit encoded packet signal. If the encoded packet signal corresponds to the mapping of D, the decoder 22 outputs a pulse D, and if it corresponds to the mapping of K, the decoder 22 outputs a pulse K, whereby the control signal is regenerated (FIG. 7(e)). The decoder 22 outputs the 8-bit scrambled packet signal and control signal to the descrambler 23.

The descrambler 23 has a random number generator corresponding to the random number generator of the scrambler 12. This random number generator is reset based on the information included in a scrambled packet signal, and generates a random number synchronizing with the random number generator of the scrambler 12. Using the random number from this random number generator, the descrambler 23 descrambles the 8-bit scrambled packet signal based on the byte clock, so as to regenerate the 8-bit packet signal (FIG. 7(f)). In this case, the descrambler 23 does not descramble a portion A of the scrambled packet signals corresponding to the period where the pulse K of the control signal exists. The descrambler 23 outputs the 8-bit packet signal and control signal to the unpacker 24.

The unpacker 24 determines the number of bytes N based on the control signal. The unpacker 24 divides the byte clock by N according to this number of bytes N of the packet, so as to regenerate the pixel clock (Pixcel Clock_Out) (FIG. 7(g)). Based on this pixel clock, the unpacker 24 unpacks the 8-bit packet signal, so as to regenerate the video signal (R/G/B_Out) for each RGB, sync signal (SYNC_Out) and data-enable signal (DE_Out) (FIG. 7(h) to (j)).

Figure 8:
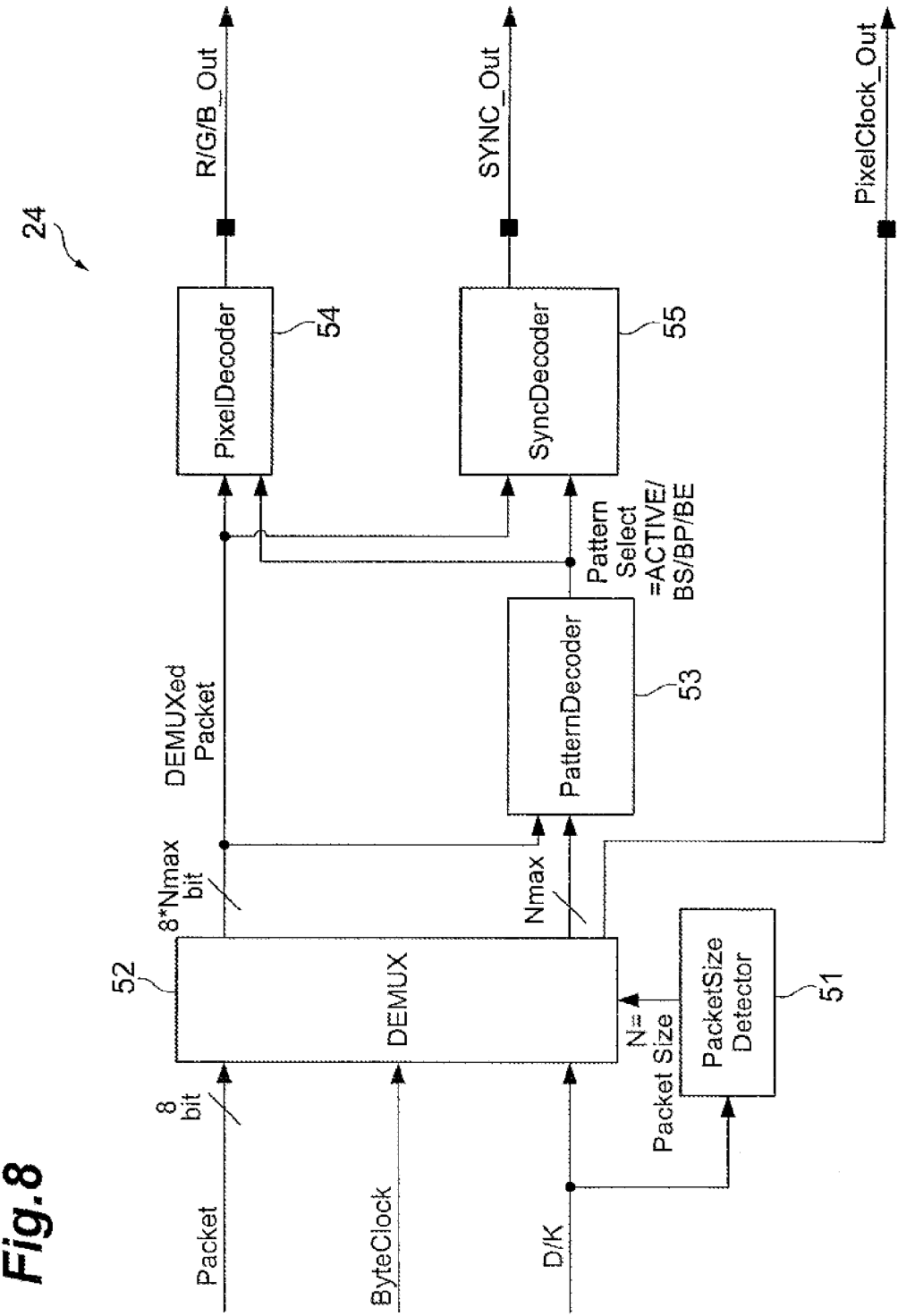
FIG. 8 is a current block diagram depicting a configuration of an unpacker according to an embodiment of the present invention.
Figure 9:
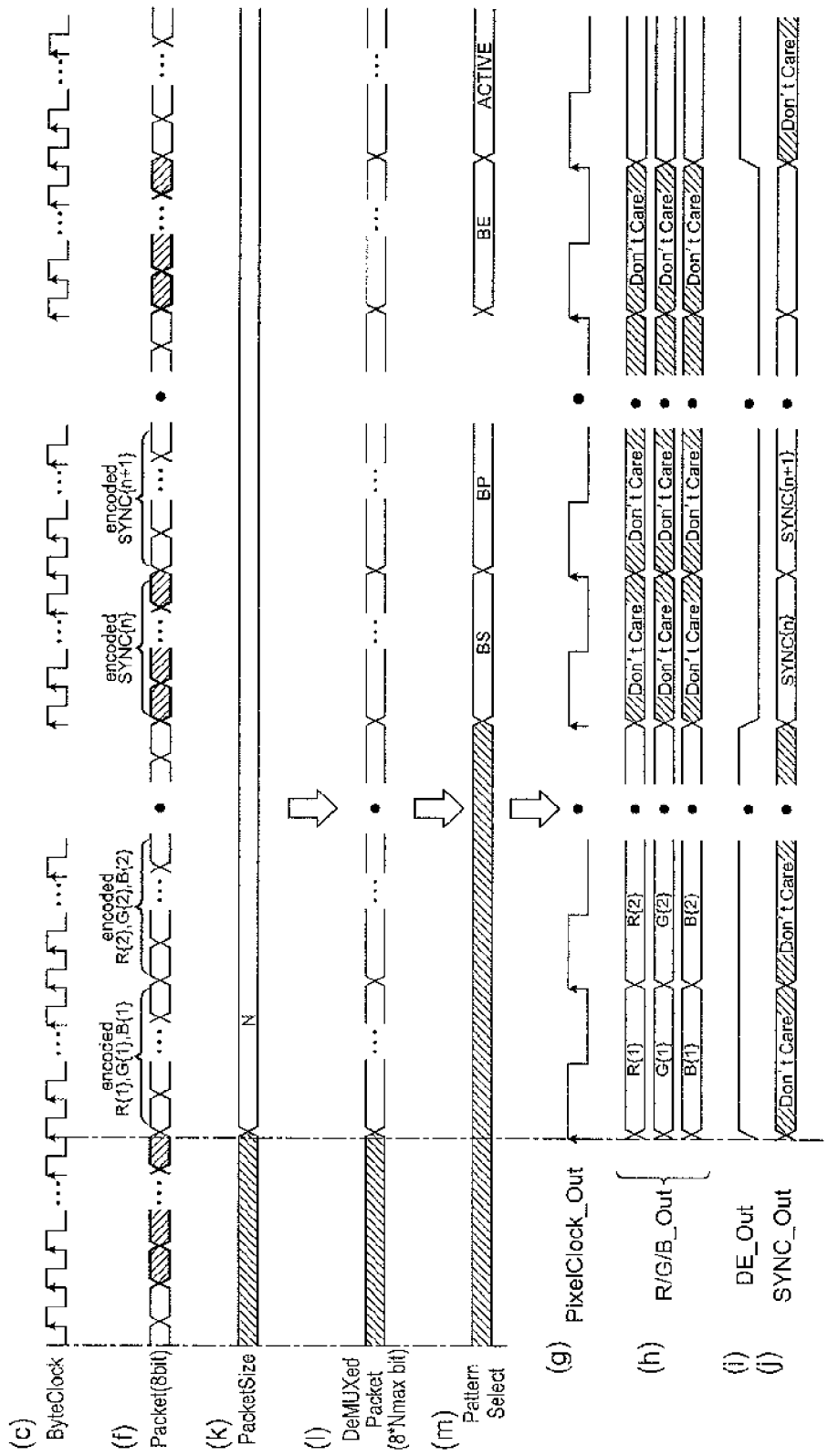
FIG. 9 is a timing chart depicting a signal of each unit in the unpacker shown in FIG. 8.

Now the unpacker 24 will be described. FIG. 8 is a circuit block diagram depicting a configuration of the unpacker according to an embodiment of the present invention, and FIG. 9 is a timing chart depicting a signal of each unit of the unpacker in FIG. 8. The unpacker 24 shown in FIG. 8 has a packet size detector (Packet Size Detector) 51, DEMUX (Demultiplexer) 52, pattern decoder (Pattern Decoder) 53, pixel decoder (Pixel Decoder) 54 and sync decoder (Sync Decoder) 55.

The packet size detector 51 controls the pulse width of the pulse K of the control signal (D/K) using the byte clock, for example, so as to determine the number of bytes N of the packet. The packet size detector 51 outputs the determined number of bytes N of the packet to the DEMUX 52 as the packet size signal (Packet Size) (FIG. 9(k)).

A packet signal (Packet), byte clock (Byte Clock) and control signal are input to the DEMUX 52. The DEMUX 52 divides the byte clock by N according to the packet size signal, so as to regenerate a pixel clock (Pixel Clock_Out). The DEMUX 52 divides the packet signal by N, so as to degenerate an 8×N-bit demux packet signal (DEMUXed Packet) (FIG. 9(l)), and regenerates an N-bit division signal. The DEMUX 52 outputs the 8×N-bit DEMUXed packet signal and N-bit division signal to the pattern decoder 53. The DEMUX 52 also outputs the 8×N-bit DEMUXed packet signal to the pixel decoder 54 and sync decoder 55.

The pattern decoder 53 decodes the 8×N-bit DEMUXed packet signal and N-bit division signal, so as to generate a pattern select signal (Pattern Select) (FIG. 9(m)). For example, if the input is a K pattern, the pattern decoder 53 outputs a blank start (BS) or blank end (BE) according to the pattern. If the input is a D pattern, [the pattern decoder 53] outputs a blank (BP) if blank is started or active (ACTIVE) if blank is ended, to the pixel decoder 54 and sync decoder 55 as the pattern select signal.

The pixel decoder 54 decodes the 8×N-bit DEMUXed packet signal, so as to regenerate the video signal (R/G/B_Out) for each RGB. Then the pixel decoder 54 outputs this video signal based on the pattern select signal. For example, the pixel decoder 54 outputs the video signal when the pattern select signal indicates "active".

The sync decoder 55 decodes the 8×N-bit DEMUXed packet signal, so as to regenerate the sync signal (SYNC_Out). Then the sync decoder 55 outputs this sync signal based on the pattern select signal. For example, the sync decoder 55 outputs the sync signal when the pattern select signal indicates a blank start, blank or blank end.

In this way, according to the video signal reception device 20 of the present embodiment, the decode unit 25 (decoder 22 in the present embodiment) regenerates a control signal including a pulse with a pulse width corresponding to a portion of a plurality of encoded packet signals on which an encode process that is different from the process for the other portion has been performed. As mentioned above, the pulse width of the pulse in this control signal corresponds to the number of bytes of the packet, so the unpacker 24 can determine the number of bytes of a packet, that is, the number of gradation bits of the video signal, by a pulse width of the pulse in the control signal, and the plurality of packet signals are unpacketized according to the number of bytes of this packet. As a result, the video signal reception device 20 can appropriately regenerate the video signal, even if the number of gradation bits of the video signal changes, and the number of bytes of a packet for each pixel of the video signal is different in the video signal transmission device 10.

In particular, an increase in the number of gradation bits of a video signal is expected in future, but according to this video signal reception device 20, an increase in the number of gradation bits of a video signal can be supported.

Also according to the video signal reception device 20 of the present embodiment, the receive signal is serial-parallel converted by the deserializer 21, so the number of signal lines can be decreased.

Furthermore, according to the video signal reception device 20 of the present embodiment, even if the signal is scrambled, the descrambler 23 does not scramble a portion of packet signals corresponding to the period where the pulse of the control signal exists, therefore the number of bytes of a packet, that is, the number of gradation bits of the video signal, can be appropriately determined based on the control signal.

According to the video signal transmission system 1 of the present embodiment, even if the number of gradation bits of the video signal changes, the video signal transmission device 10 can make the number of bytes of a packet different for each pixel of a video signal, and the video signal reception device 20 can determine the number of bytes of a packet for each pixel of the video signal and appropriately regenerate the video signal, therefore the video signal can be appropriately transmitted and received.

In particular, an increase in the number of gradation bits of a video signal is expected in future, but according to this video signal transmission system 1, an increase in the number of gradation bits of a video signal can be supported.

Also according to the video signal transmission system 1, the transmission signal is parallel-serial converted by the serializer 14 in the video signal transmission device 10, and the receive signal is serial-parallel converted by the deserializer 21 in the video signal reception device 20, as mentioned above, so the number of signal lines can be decreased.

Furthermore, according to the video signal transmission system 1, even if the signal is scrambled, the control signal can be appropriately regenerated and the number of bytes of a packet, that is, the number of gradation bits of the video signal, can be appropriately determined based on the regenerated control signal.

The present invention is not limited to the above mentioned embodiments, but can be modified in various ways.

In the video signal transmission device 10 of the present embodiment, the pulse K is inserted at two locations of the control signal, that is, at the portion corresponding to the period where the blank start of the pattern select signal exists and at the portion corresponding to the period where the blank end exists, but the pulse K may also be inserted at either one of the portion corresponding to the period where the blank start of the pattern select signal exists, and the portion corresponding to the period where the blank end exists. The pulse K may exist in a period where an active pattern select signal exists, or where a period where a blank exists.

In the video signal reception device 20 of the present embodiment, the unpacker 24 determines the number of bytes of a packet based on the regenerated control signal, but a set value of the number of bytes of a packet to be used in the video signal transmission device 10 may be input from the outside. The difference of the video signal reception device according to this variant form from the present embodiment is that the video signal reception device 20 has an unpacker 24A instead of the unpacker 24.

Figure 10:
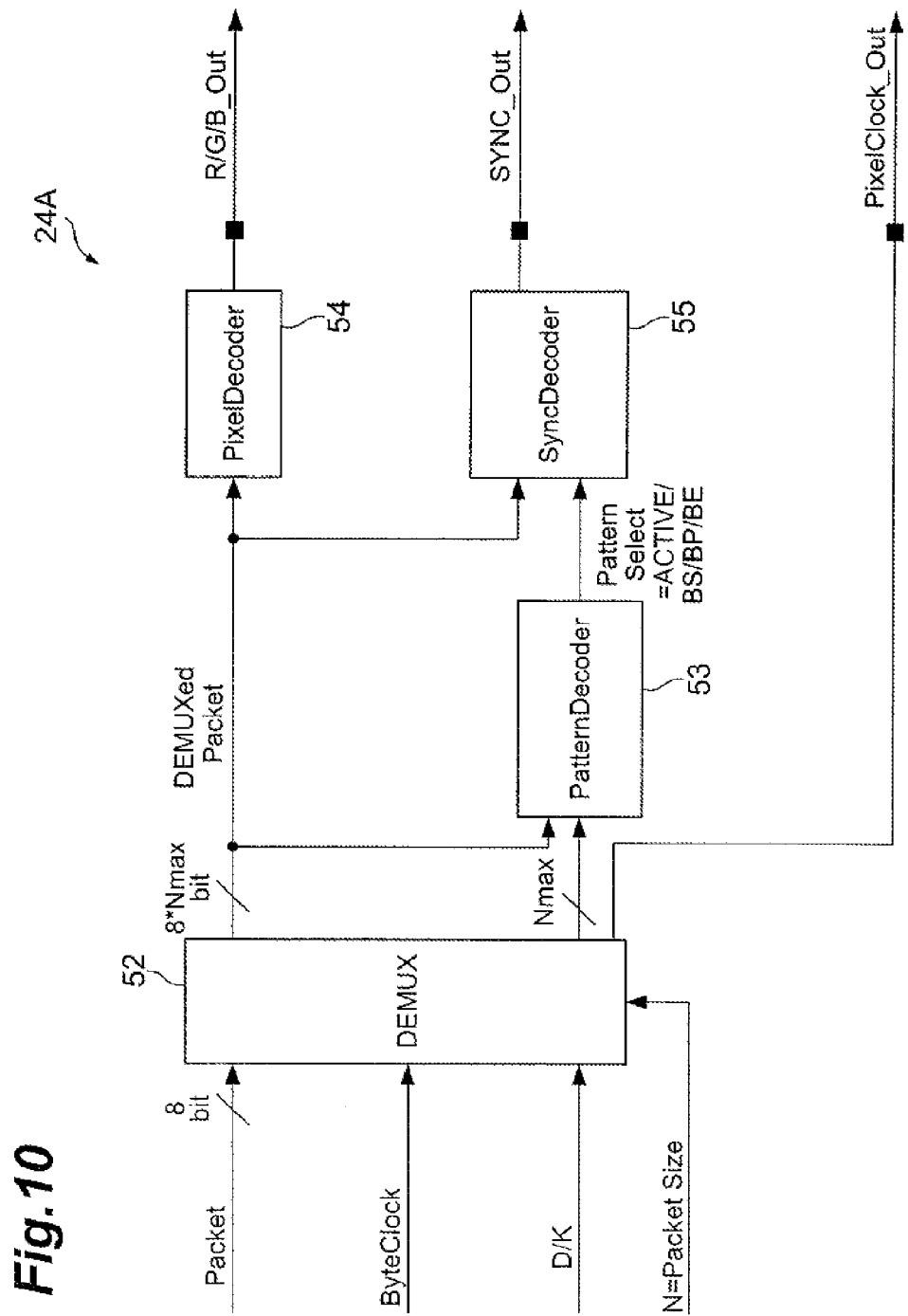
FIG. 10 is a circuit block diagram depicting a configuration of an unpacker according to a variant form of the present invention.

FIG. 10 is a circuit block diagram depicting a configuration of the unpacker 24A according to the variant form of the present invention, and FIG. 11 is a timing chart depicting a signal of each unit of the unpacker 24A shown in FIG. 10, just like FIG. 9. The difference of the unpacker 24A from the unpacker 24 is that the packet size detector 41 is not included, and the packet size signal to be input to the DEMUX 42 is input from the outside (FIG. 11(k2)).

According to the video signal reception device of this variant form using the unpacker 24A as well, the same advantages as the video signal reception device 20 of the present embodiment can be implemented.

The invention claimed is:

1. A video signal transmission device, comprising:
   a packer which receives
      a video signal,
      a sync signal and
      a data-enable signal, and
         generates, based on the data-enable signal, a pattern select signal including:
            an active period (ACTIVE),
            a blank start period (BS),
            a blank period (BP)
            a blank end period (BE), and
         encodes the video signal during the active period (ACTIVE),
         encodes the sync signal during the blank start period (BS),
         encodes the sync signal during the blank period (BP),
         encodes the sync signal during the blank end period (BE),
            a width of the blank start period (BS) and
            a width of the blank end period (BE)
            each corresponding to the number of gradation bits of the video signal, and
         generates a plurality of packet signals by packetizing said encoded video signal and said encoded sync signal based on a byte clock,
            wherein the byte clock depends on the number of gradation bits of said video signal, and
   an encode unit which generates a plurality of encoded packet signals by encoding said plurality of packet signals from said packer; wherein the encoding processes for the packet signals during the blank start period (BS) and during the blank end period (BE) differ from the encoding process for the other part, and
   a serializer which generates a serial packet signal by parallel-serial converting said plurality of encoded packet signals from said encode unit.

2. The video signal transmission device according to claim 1, wherein
   said encode unit comprises:
   a scrambler which generates a plurality of scrambled packet signals by scrambling said plurality of packet signals from said packer, except for in a case when a portion of the packet signals corresponds to the blank start period (BS) and the blank end period (BE); and
   an encoder which generates said plurality of encoded packet signals by encoding said plurality of scrambled packet signals from said scrambler,
   said scrambler does not scramble a portion of said packet signals corresponding to the period where said pulse of said control signal exists, and
   said encoder encodes portions of said scrambled packet signals corresponding to the blank start period (BS) and the blank end period (BE) by using a different encoding process compared to the other portion of said scrambled packet signals.

3. A video signal transmission system, comprising:
   a video signal transmission device, comprising:
   a packer which receives
      a video signal,
      a sync signal and
      a data-enable signal, and
         generates, based on the data-enable signal, a pattern select signal including:
            an active period (ACTIVE),
            a blank start period (BS),
            a blank period (BP)
            a blank end period (BE), and
         encodes the video signal during the active period (ACTIVE),
         encodes the sync signal during the blank start period (BS),
         encodes the sync signal during the blank period (BP),
         encodes the sync signal during the blank end period (BE),
            a width of the blank start period (BS) and
            a width of the blank end period (BE)
            each corresponding to the number of gradation bits of the video signal, and
         generates a plurality of packet signals by packetizing said encoded video signal and said encoded sync signal based on a byte clock,
            wherein the byte clock depends on the number of gradation bits of said video signal, and
   an encode unit which generates a plurality of encoded packet signals by encoding said plurality of packet signals from said packer; wherein the encoding processes for the packet signals during the blank start period (BS) and during the blank end period (BE) differ from the encoding process for the other part, and
   a serializer which generates a serial packet signal by parallel-serial converting said plurality of encoded packet signals from said encode unit; and
   a video signal reception device for receiving a serial packet signal, the video signal reception device comprising:
   a deserializer which regenerates a plurality of encoded packet signals by serial-parallel converting said serial packet signal;
   a decode unit which regenerates a plurality of packet signals by decoding said plurality of encoded packet signals from said deserializer; and an unpacker which regenerates a video signal, a sync signal and a data-enable signal by unpacketizing said plurality of packet signals from said decode unit, said decode unit regenerating a control signal including a pulse with a pulse width corresponding to a period of a portion of said plurality of encoded packet signals, which is a portion on which an encode process that is different from a process for the other portion has been performed, and said unpacker determining the number of bytes of a packet based on the pulse width of said pulse in said control signal from said decode unit and unpacketizing said plurality of packet signals according to the number of bytes of said packet.

4. A video signal transmission system, comprising:
a video signal transmission device, comprising:
a packer which receives
  a video signal,
  a sync signal and
  a data-enable signal, and
    generates, based on the data-enable signal, a pattern select signal including:
      an active period (ACTIVE),
      a blank start period (BS),
      a blank period (BP)
      a blank end period (BE), and
    encodes the video signal during the active period (ACTIVE),
    encodes the sync signal during the blank start period (BS),
    encodes the sync signal during the blank period (BP),
    encodes the sync signal during the blank end period (BE),
      a width of the blank start period (BS) and
      a width of the blank end period (BE)
        each corresponding to the number of gradation bits of the video signal, and
    generates a plurality of packet signals by packetizing said encoded video signal and said encoded sync signal based on a byte clock,
      wherein the byte clock depends on the number of gradation bits of said video signal, and
an encode unit which generates a plurality of encoded packet signals by encoding said plurality of packet signals from said packer; wherein the encoding processes for the packet signals during the blank start period (BS) and during the blank end period (BE) differ from the encoding process for the other part, and
a serializer which generates a serial packet signal by parallel-serial converting said plurality of encoded packet signals from said encode unit; and
a video signal reception device for receiving a serial packet signal the video signal reception device, comprising:
a deserializer which regenerates a plurality of encoded packet signals by serial-parallel converting said serial packet signal;
a decode unit which regenerates a plurality of packet signals by decoding said plurality of encoded packet signals from said deserializer; and
an unpacker which regenerates a video signal, a sync signal and a data-enable signal by unpacketizing said plurality of packet signals from said decode unit,
said a packer receiving a set value of the number of bytes of a packet corresponding to the number of gradation bits of said video signal and unpacketizing said plurality of packet signals according to the set value of the number of bytes of said packet.

5. A video signal transmission system, comprising:
a video signal transmission device, comprising:
a packer which receives
  a video signal,
  a sync signal and
  a data-enable signal, and
    generates, based on the data-enable signal, a pattern select signal including:
      an active period (ACTIVE),
      a blank start period (BS),
      a blank period (BP)
      a blank end period (BE), and
    encodes the video signal during the active period (ACTIVE),
    encodes the sync signal during the blank start period (BS),
    encodes the sync signal during the blank period (BP),
    encodes the sync signal during the blank end period (BE),
      a width of the blank start period (BS) and
      a width of the blank end period (BE)
        each corresponding to the number of gradation bits of the video signal, and
    generates a plurality of packet signals by packetizing said encoded video signal and said encoded sync signal based on a byte clock,
      wherein the byte clock depends on the number of gradation bits of said video signal, and
an encode unit which generates a plurality of encoded packet signals by encoding said plurality of packet signals from said packer; wherein the encoding processes for the packet signals during the blank start period (BS) and during the blank end period (BE) differ from the encoding process for the other part, and
a serializer which generates a serial packet signal by parallel-serial converting said plurality of encoded packet signals from said encode unit; and
wherein said encode unit comprises:
a scrambler which generates a plurality of scrambled packet signals by scrambling said plurality of packet signals from said packer, except for in a case when a portion of the packet signals corresponds to the blank start period (BS) and the blank end period (BE); and
an encoder which generates said plurality of encoded packet signals by encoding said plurality of scrambled packet signals from said scrambler, and
said encoder encodes portions of said scrambled packet signals corresponding to the blank start period (BS) and the blank end period (BE) by using a different encoding process compared to the other portion of said scrambled packet signals; and
a video signal reception device for receiving a serial packet signal, the video signal reception device comprising:
a deserializer which regenerates a plurality of encoded packet signals by serial-parallel converting said serial packet signal;
a decode unit which regenerates a plurality of packet signals by decoding said plurality of encoded packet signals from said deserializer; and
an unpacker which regenerates a video signal, a sync signal and a data-enable signal by unpacketizing said plurality of packet signals from said decode unit,
said decode unit regenerating a control signal including a pulse with a pulse width corresponding to a period of a portion of said plurality of encoded packet signals, which is a portion on which an encode process that is different from a process for the other portion has been performed, and said unpacker determining the number of bytes of a packet based on the pulse width of said pulse in said control signal from said decode unit and unpacketizing said plurality of packet signals according to the number of bytes of said packet, wherein said decode unit comprises:

a decoder which regenerates a plurality of scrambled packet signals by decoding said plurality of encoded packet signals from said deserializer; and a descrambler which regenerates said plurality of packet signals by descrambling said plurality of scrambled packet signals from said decoder, wherein said decoder regenerates said control signal including a pulse with a pulse width corresponding to a period of a portion of said plurality of encoded packet signals on which an encode process that is different from a process for the other portion has been performed, and wherein said descrambler does not descramble a portion of said packet signals corresponding to a period where the pulse of said control signal exists.

\* \* \* \* \*